(12) United States Patent
Phillips et al.

(10) Patent No.: US 11,488,214 B2
(45) Date of Patent: Nov. 1, 2022

(54) HIGH AUTHENTICATION LAYER TO DETERMINE A PERSON'S LOCATION WHEN CONSIDERING SENDING A SECURE OBJECT

(71) Applicant: Capital One Services, LLC, McLean, VA (US)

(72) Inventors: Jeremy Phillips, Brooklyn, NY (US); David Perks, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/592,501

(22) Filed: Oct. 3, 2019

(65) Prior Publication Data
US 2021/0103961 A1    Apr. 8, 2021

(51) Int. Cl.
| | | |
|---|---|---|
| *G06Q 30/02* | (2012.01) | |
| *G06Q 10/08* | (2012.01) | |
| *G06Q 20/20* | (2012.01) | |
| *G06Q 20/32* | (2012.01) | |
| *G06Q 20/38* | (2012.01) | |
| *G06Q 20/40* | (2012.01) | |
| *G06Q 20/42* | (2012.01) | |
| *G06Q 40/02* | (2012.01) | |
| *G06Q 30/00* | (2012.01) | |

(52) U.S. Cl.
CPC ....... *G06Q 30/0281* (2013.01); *G06Q 10/083* (2013.01); *G06Q 20/202* (2013.01); *G06Q 20/206* (2013.01); *G06Q 20/3224* (2013.01); *G06Q 20/3255* (2013.01); *G06Q 20/385* (2013.01); *G06Q 20/4012* (2013.01); *G06Q 20/425* (2013.01); *G06Q 40/02* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 6,081,792 | A * | 6/2000 | Cucinotta | G06Q 20/403 |
| | | | | 235/379 |
| 6,955,294 | B1 * | 10/2005 | Seegar | G06Q 20/40 |
| | | | | 235/379 |
| 8,805,736 | B2 | 8/2014 | Melik-Aslanian et al. | |
| 10,432,605 | B1 * | 10/2019 | Lester | G06F 21/552 |

(Continued)

FOREIGN PATENT DOCUMENTS

CA        3013973 A1 *  3/2012  ............ G06Q 20/02

OTHER PUBLICATIONS

Alhothaily, Abdulrahman, "Secure Verification for Payment and banking Systems", The George Washington University, Aug. 31, 2017. (Year: 2017).*

*Primary Examiner* — Neha Patel
*Assistant Examiner* — Clay C Lee
(74) *Attorney, Agent, or Firm* — KDB

(57) ABSTRACT

A system, apparatus, and method are disclosed to enable a bank to send a secure object to a bank customer at a remote location. In addition to performing authentication, the system and method exploit the payment rails to verify transactions by the bank customer, as well as to confirm the physical location of the customer. The bank customer who is successfully verified may receive the secure object by courier at the remote location within a limited time period of the request.

20 Claims, 12 Drawing Sheets

(56) References Cited

U.S. PATENT DOCUMENTS

| | | | |
|---|---|---|---|
| 2003/0229548 A1* | 12/2003 | Kakuta | G07F 7/0886 |
| | | | 705/26.1 |
| 2006/0161435 A1* | 7/2006 | Atef | G06Q 20/4015 |
| | | | 704/246 |
| 2008/0249928 A1 | 10/2008 | Hill et al. | |
| 2009/0112768 A1 | 4/2009 | Hammad et al. | |
| 2009/0119190 A1* | 5/2009 | Realini | G06Q 20/3265 |
| | | | 705/37 |
| 2010/0057609 A1* | 3/2010 | Sibson | G06Q 40/025 |
| | | | 705/40 |
| 2010/0145852 A1* | 6/2010 | Morson | G06Q 20/1085 |
| | | | 705/43 |
| 2011/0302084 A1 | 12/2011 | Melik-Aslanian et al. | |
| 2016/0012465 A1* | 1/2016 | Sharp | G06Q 20/321 |
| | | | 705/14.17 |
| 2017/0228760 A1* | 8/2017 | Mason-Gugenheim | |
| | | | G06Q 20/3276 |
| 2018/0114216 A1* | 4/2018 | Joseph | G06Q 20/40145 |
| 2018/0308100 A1* | 10/2018 | Haukioja | H04L 63/102 |
| 2019/0122220 A1* | 4/2019 | Phillips | G06F 21/33 |

\* cited by examiner

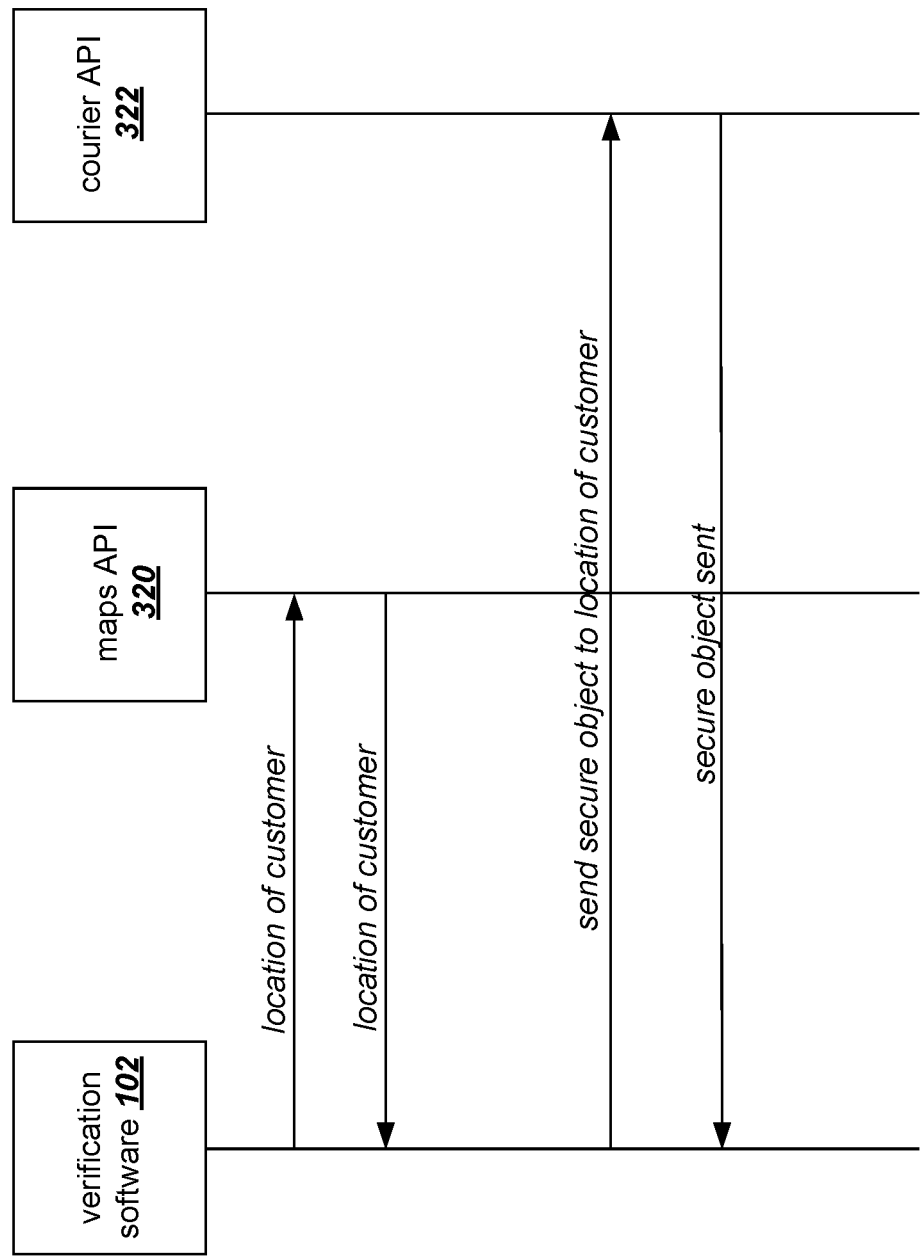

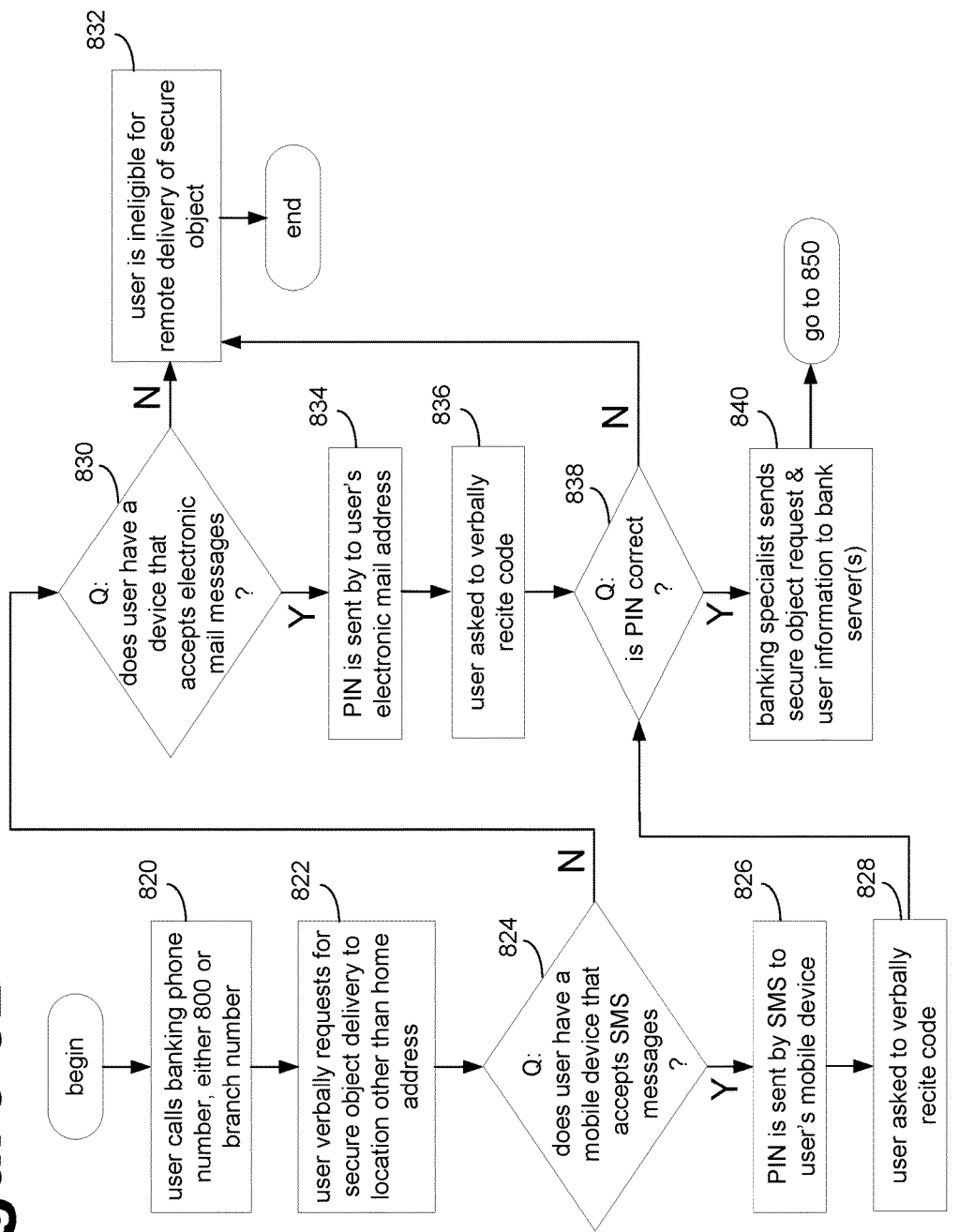

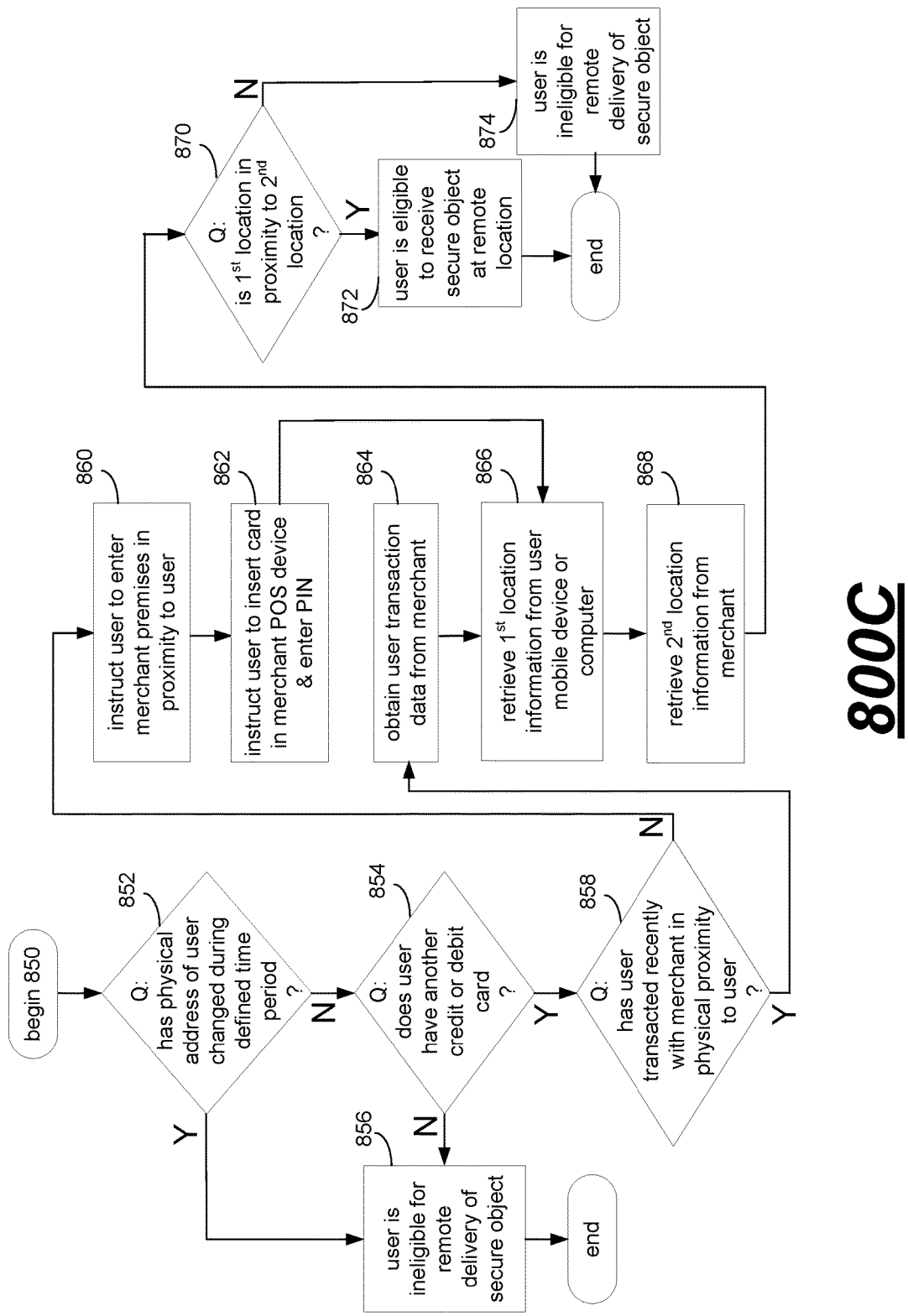

US 11,488,214 B2

HIGH AUTHENTICATION LAYER TO DETERMINE A PERSON'S LOCATION WHEN CONSIDERING SENDING A SECURE OBJECT

BACKGROUND

Banks have prescribed rules for sending secure objects, such as debit or credit cards, to a bank customer. If the bank customer's physical address, stored in a database of the bank, has not changed, the customer may call the bank and request a new debit or credit card, after which the card will be sent by postal mail to the physical address. If the bank customer's physical address has changed, the bank customer will have to wait a predetermined time period before the card is mailed to the new physical address. The bank customer is able to go to the bank's branch directly to replace the card in this circumstance.

If the bank customer is not at or near the physical address, but still desires to replace a credit or debit card, the options may be limited under the prescribed rules. This may happen while the bank customer is on a business trip or on vacation, for example. The unavailability of bank branches in the remote location may frustrate the bank customer. The inability to replace a debit or credit card in such circumstances may leave the bank customer unable to complete financial transactions at the remote location.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to send a secure object to a bank customer when the customer is not at a physical address known to the bank. Based on verification of customer stability, transaction history, and physical location, the secure object is delivered by courier on behalf of the bank within a limited time period. Based on these techniques, the bank has a high degree of confidence that the secure object is being delivered to the bank customer and not a fraudster.

Further, an embodiment is directed to an apparatus comprising a processor and memory coupled to the processor, the memory comprising instructions that, when executed by the processor, cause the processor to receive, from a user device over a wireless communication network, a request for a secure object from an accountholder of a bank, wherein the secure object is a physical object to be delivered by a courier system to a physical address different than a permanent physical address of the accountholder, confirm, by consulting a lookup table in a database stored in a storage device controlled by the bank, that the accountholder is eligible to receive the secure object, authenticate the accountholder by causing a prompt on a display device of a point-of-sale (POS) device to instruct the accountholder to insert a transaction card into the POS device and enter, via a user interface of the POS device, a Personal Identification Number (PIN) associated with the transaction card, and receiving, via a network interface of the POS device, an Application Programming Interface (API) communication from the POS device, the API communication comprising an indication confirming that the PIN is associated with the transaction card, receive, via a network interface of the user device, a second API communication comprising an indication of the physical address entered by the accountholder via a user interface of the user device, and transmit a third API communication to the courier system, the third API communication comprising instructions to retrieve the secure object from the bank and deliver the secure object to the accountholder at the physical address.

To the accomplishment of the foregoing and related ends, certain illustrative aspects are described herein in connection with the following description and the annexed drawings. These aspects are indicative of the various ways in which the principles disclosed herein may be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 7 illustrates the secure object delivery portion of the verification software of FIGS. 1 and 2.

FIGS. 8A-8C illustrate a flow diagram of a method for implementing the verification software of FIGS. 1 and 2.

DETAILED DESCRIPTION

Figure 1:
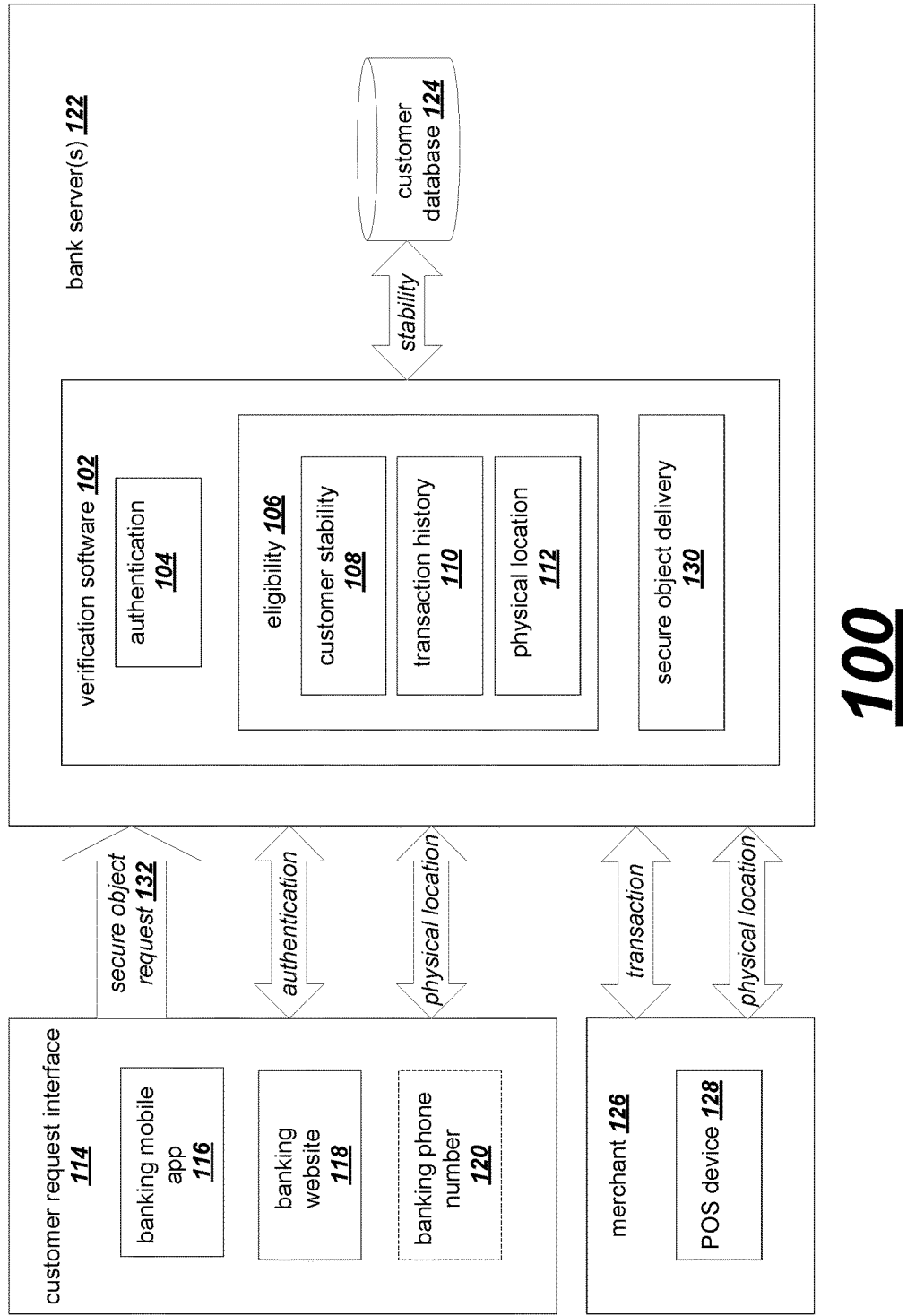
FIG. 1 illustrates an embodiment of a system for verification before sending a secure object.

Various embodiments are directed to a system and method to enable a bank to send a secure object to a bank customer at a remote location. In addition to performing authentication, the system and method exploit the payment rails to verify transactions by the bank customer, as well as to confirm the physical location of the customer. The bank customer who is successfully verified may receive the secure object by courier at the remote location within a limited time period of the request.

With general reference to notations and nomenclature used herein, the detailed descriptions which follow may be presented in terms of program processes executed on a computer or network of computers. These process descriptions and representations are used by those skilled in the art to most effectively convey the substance of their work to others skilled in the art.

A process is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The processes presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments may be practiced without these specific details. In other instances, well-known structures and devices are shown in block diagram form in order to facilitate a description thereof. The intention is to cover all modifications, equivalents, and alternatives consistent with the claimed subject matter.

FIG. 1 is a simplified block diagram of a system for verification before sending secure object 100, or verification system for short. The verification system 100 provides a high authentication layer to determine a person's location before considering sending a secure object to the person. The person is a customer of the bank, also known herein as a bank customer, an accountholder, and a user.

The verification system 100 is designed to exploit existing payment rails to determine the bank customer's physical location before delivering the secure object to the customer at a location other than the customer's physical address known to the bank. The secure object may include any physical object of value to the customer that is related to the business of the bank. Thus, the secure object may include, but is not limited to, a debit card, a credit card, a pre-paid card, secure documents such as loan documents, a book of checks, and cash. As another example, the verification system 100 may be used to determine the bank customer's location in advance of an in-person meeting between the bank customer and a bank employee.

As referred to herein, payment rails consist of the payment platform or payment network that moves money from a payer to a payee. The payer/payee may be a consumer or a business. Credit card rails are the credit card payment system. Blockchain is another type of payment rail, PayPal® and Venmo® are types of electronic payment rails. A payment rail in which transferred funds are available immediately is known as a real-time rail.

The verification system 100 includes bank server(s) 122 on which resides verification software 102 and a customer database 124. The verification software 102 includes authentication 104, eligibility 106, and secure object delivery 112. Upon receiving a secure object request 132 from a customer request interface 114, the verification software 102 accesses the customer database 124 and also interacts with a merchant 126, as part of its verification operations.

The bank server(s) 122, of which there may be one or many, are controlled by the bank. The bank server(s) 122 are part of a processor-based computing system of the bank, which may be on the premises of the bank or at another location, may be a cloud server or may be a combination of on-premises, off-premises, and cloud-based computing. The verification software 102 may be on-premises while the customer database 124 is off-premises, and vice-versa. In one example, the bank server(s) 122 consist of cloud-based servers, such as Amazon's Web Service (AWS) cloud servers. Communication between the verification software 102 on the bank server(s) 122 and the customer request interface 114 and merchant 126 may be via a wireless communication network.

The verification software 102 of the bank server(s) 122 receives the secure object request 132 from the customer request interface 114. The customer request interface 114 may be a banking mobile application 116, or mobile app for short, that is displayed on and accessible using a user (mobile) device, such as a smartphone. Or, the customer request interface 114 may be a banking website 118 displayed on and accessible from a user (computing) device of the bank customer, such as a personal computer, a laptop, a desktop, a server, a tablet, a personal digital assistant, or any other device that enables the bank customer to have access to the Internet. The banking website 118 may also be displayed on and accessible from a smartphone or other mobile device. From either the banking mobile app 116 or the banking website 118, the bank customer is able to make the secure object request 132.

By accessing the banking website 118 and providing a username and password as authentication, the accountholder is able to receive a wealth of information about his/her bank account, including recent purchases, transaction entities involved in the purchases, and the ability to view statements. The web accesses also enable transactions from the banking web site to take place, known colloquially as "online banking", in which automatic payments may be scheduled and money may be transferred between different accounts of the user, to a third-party account within the same bank, and even to a third-party account with another bank. Relying on this Internet-based access, today's bank customer may view the current balance of an account twenty-four hours a day, seven days a week.

With the proliferation of hand-held device technology, such as smart phones, many banks have made applications (known colloquially as "apps") available to their customers. As long as the smartphone is able to access the Internet, the bank may provide a downloadable app for accessing a customer's bank account from the smartphone. Similar to the web page, the app, once selected, will similarly request a username and password to authenticate the bank customer. Alternatively, some apps enable access using a fingerprint or voiceprint to authenticate the bank customer. Once authenticated, the bank customer is able to review the account, such as to obtain balance information, scroll through transactions, make transfers to another account, deposit checks, and so on. These apps are intended to enhance the convenience for the accountholder. So, in addition to being able to access one's checking account by accessing a web page, a user may similarly access the account by enabling the app on a smartphone.

Optionally, the customer request interface 114 may also include a banking phone number, which could be a local branch bank number or a toll-free (800) number. The verification software 102 relies on the customer request interface 114 for both authentication and physical location verification. With some additional steps, as further described in FIG. 8B, the user who contacts the bank using a banking phone number 120 may be authenticated by instructing the user to recite a personal identification number (PIN) received via Short Message Service (SMS), also known as text messaging, or electronic mail. The mobile or computing device used for these operations may thereafter be used to determine the user's physical location.

The eligibility 106 portion of the verification software 102 includes additional processes: customer stability 108, transaction history 110, and physical location 112, for determining whether to send the secure object to the bank customer at the remote location. The customer stability portion 108 accesses a customer database 124 of the bank server(s) 122 to confirm that the bank customer's physical address has not been changed for a predetermined time period, such as 30 days. The transaction history portion 110 communicates with the remote merchant 126 to obtain transaction data of the bank customer, if any. Use of a point-of-sale (POS) device 128 of the merchant 126 by the bank customer affirms the location of the accountholder. The physical location portion 112 utilizes both the customer request interface 114 and the POS device 128 of the merchant 126 to determine with confidence the location of the requesting bank customer.

Thus, the verification software 102 receives valuable information from three entities, the customer request interface 114, the merchant 126, and the customer database 124, in enabling the bank to assess whether to send the requested secure object to the requesting customer. The merchant 126 provides both transaction and physical location information. The customer request interface 114 provides both authentication and physical location information. The customer database 124 provides stability information. The individual processes of the verification software 102 are explained in more detail below.

The merchant 126 consists of a business that sells goods or services to the general public and which has at least one POS device 128 on its premises. Optionally, the merchant 126 may include an Automated Teller Machine (ATM), since ATMs include POS devices.

The verification system 100 thus authenticates the requesting user as its bank customer, determines the eligibility to receive the secure object based on its stability, transaction history, and physical location, and enables delivery of the secure object at or near the physical location rather than delivering the object to the known address on file of the customer. The operations of the verification software 102 enable the bank to have a high degree of confidence that the secure object will be delivered to the bank customer and not to a fraudster posing as the bank customer.

Figure 2:
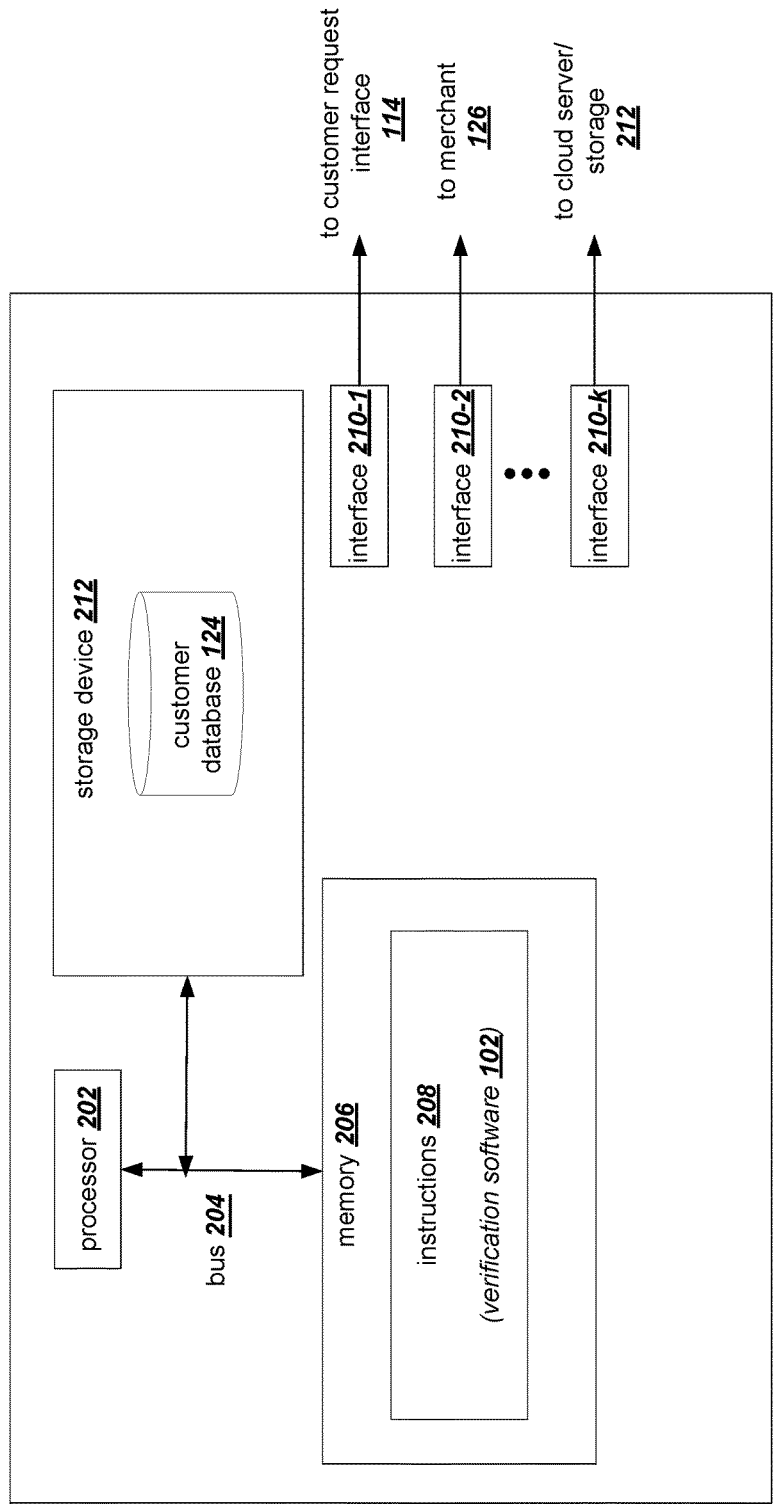
FIG. 2 illustrates an embodiment of an apparatus to implement the system of FIG. 1.

FIG. 2 is a simplified block diagram of an apparatus for verification before sending secure object 200, or apparatus 200. The apparatus 200 is a computing system consisting of a processor 102, a bus 204, and a memory 206, in which the processor is coupled to the memory via the bus. The processor 202 consists of circuitry arranged to execute instructions and may be a commercial processor including multiple cores. The processor 202 and memory 204 may be based on any of a variety of types of processor and memory circuitry, respectively, numerous examples of which are provided in conjunction with FIG. 9. In the memory 206 are stored instructions 208 which are executable by the processor 202. Instructions 208 may also be referred to herein as "verification software 102" for convenience.

Also coupled to the processor 202 via the bus 204 is a storage device 212. The storage device 212 may be based on any of a variety of types of storage circuitry, numerous examples of which are provided in conjunction with FIG. 9. In the illustration, the customer database 124 is in the storage device 212. Alternatively, the customer database 124 may be stored in off-premises storage, such as a cloud server/storage device 212.

The apparatus 200 further includes k interfaces 210-1-210-k, for integer k, for making connections external to the apparatus (collectively, "interfaces 210"). In three examples, the apparatus 200 is coupled to the customer request interface 114, the merchant 126 and the cloud server/storage 212. These interfaces 210 may be wired for local connections, wireless for remote connections, or may be a combination of wired and wireless connections.

Figure 3:
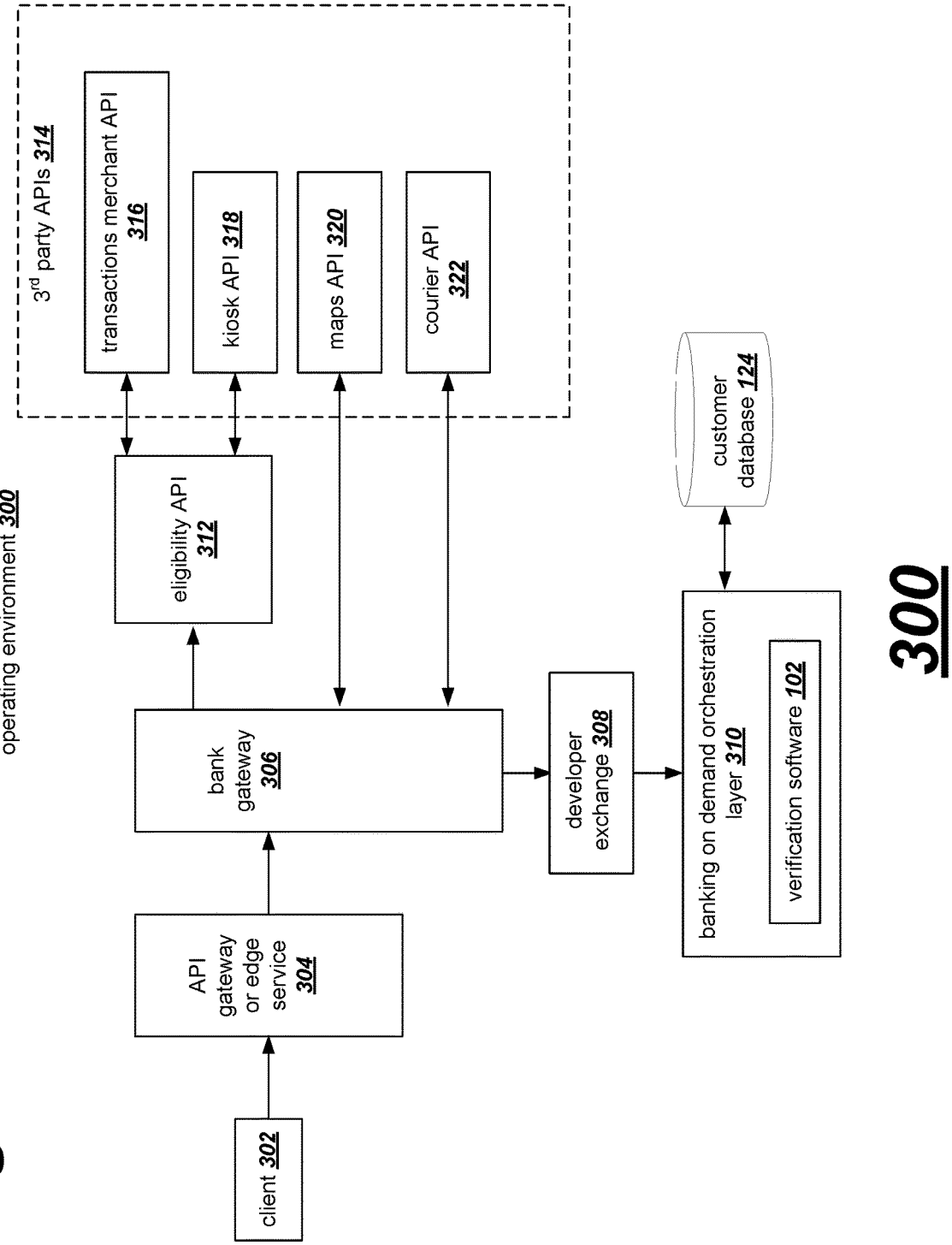
FIG. 3 illustrates an operating environment in which the verification software of FIGS. 1 and 2 may be used.

FIG. 3 is a simplified block diagram of an operating environment 300 in which the verification software 102 of FIGS. 1 and 2 may be deployed. The operating environment 300 is a software stack for a Banking On Demand (BOD) architecture of a hypothetical bank. The ability of a bank customer to request delivery of a secure object at a location other than the physical address of the customer is one example of BOD services offered by the bank. The operating environment 300 consists of a client 302, an Application Programming Interface (API) gateway or edge service 304 (edge service 304 for short), a bank gateway 306, a developer exchange 308, and a BOD orchestration layer 310, and the customer database 124 referenced also in FIGS. 1 and 2. An eligibility API 312 is an interface to third party APIs 314, which including a transaction merchants API 316, a kiosk API 318, a maps API 320, and a courier API 322. The transactions merchant API 316 is associated with the merchant 126 in FIG. 1 and the kiosk API 318 is associated with the POS device 128 of that merchant.

The client 302 may be a device serving one of the customer request interfaces 114 of FIG. 1. The client 302 may be a mobile client, such as a smartphone or other mobile device, a laptop, a tablet, and so on, from which the banking mobile app 116 is invoked. Or the client 302 may be a client such as a desktop computer from which the banking website 118 is invoked. The edge service 304 is a secure interface that has certain rules and protections that ensure things like denial of service attacks do not occur. The client 302 makes requests to internal and external APIs through the edge service 304, bank gateway 306, the developer exchange 308, and/or the orchestration layer 310.

The bank gateway 306 is a conduit between the orchestration layer 310 (including the developer exchange 308) and the APIs, whether internal APIs (the eligibility API 312) or third-party APIs 314. APIs are mechanisms by which programming code communicates with other programming code, such as by communicating variables/values, objects, etc. APIs are sets of subroutine definitions, communication protocols, and tools for building software. The developer exchange 308 is a common software architecture where internal or external microservices (e.g., APIs or combinations of APIs) are stored. These microservices, like APIs, are essentially contracts between internal code (e.g., the verification software 102) and external code, where the internal code asks questions in a predefined format, and the external API returns an answer in another predefined format.

The BOD orchestration layer (OL) 310 makes requests for internal and external APIs via the developer exchange 308. The orchestration layer is part of many modern cloud-based microservices (API) powered software architecture. The verification software 102 is shown as part of the BOD OL 310. The verification software 102 may include different services and/or microservices (not pictured) to perform different functions. The verification software 102 may provide code to orchestrate the different services, which may communicate via one or more APIs. The customer database 124 stores information about bank customers. The customer database 124 may be local to the orchestration layer, such as on the bank server(s) 122 (FIG. 1) or may be remote. In some embodiments, the customer database 124 is part of Amazon's Web Services (AWS) cloud-based servers.

The APIs of the operating environment 300 are used by the verification software 102 to perform several operations. The third-party APIs 114 such as the maps API 320 and the courier API 322 are integrated into the orchestration layer 310 through the developer exchange 308. The maps API 320 may be, as one example, the Google Maps API, for mapping the location of a customer delivery point and branch package origination point. The courier API 322 may be, as one example, the FedEx API or the Postmates API, for estimating an order, ordering, and tracking a courier. These third-party APIs 314, as well as the internal eligibility API 312, are connected through the bank gateway 306 to the developer exchange 308.

Within the orchestration layer 310, the verification software 102 will send a request to a third-party API, which may include confidential and encrypted information. The developer exchange 308 ensures that the request stays encrypted when sent to the third party. The third-party API decodes the encrypted information, receives the request, and responds to the request. For example, the verification software 102 may ask the eligibility API 312 a query such as, "Can we ship the card to this accountholder"? The eligibility API may respond with a "yes", "no", or "step up further" response.

The eligibility API 312 and/or an associated microservice, makes a determination based on a variety of parameters in its own codebase. Using the eligibility API 312, the customer stability portion 108 of the verification software 102 is able to determine if the permanent address on file, phone number, and email address of the accountholder have been stable and unchanged for 30 days. Using the eligibility API 312, which may call the transactions merchant API 316, the transaction history portion 110 of the verification software 102 is able to determine whether the accountholder has transacted with a merchant and the physical location portion 112 is able to determine the physical location of the bank customer. Similarly, the eligibility API 312, by calling the kiosk API 318, the transaction history 110 and physical location 112 portions of the verification software 102, will be able to determine whether the bank customer is eligible to receive the secure object at a remote location. The transaction history 110 may consist of a single interaction by the bank customer with the merchant, all interactions in a single time period, or a more detailed history of transactions with the merchant.

The API gateway or edge service 304 is a gateway service that provides a layer of security between the client 302 and other components of the operating environment 300. Similarly, the bank gateway 306 provides a layer of security between the application OL 310 and at least the third-party APIs 314 and/or the client 302. More generally, the gateways 304, 306 may provide dynamic routing, monitoring, resiliency, and security in the operating environment 300. Therefore, communications between the client 302 and the remaining components of the operating environment 300 may pass through the secure interface of the API gateway or edge service 304. Similarly, communications between the BOD OL 310 and at least the third-party APIs 314 may pass through the secure interface of the bank gateway 306. Communication between the client 302 and the verification software 102 at the BOD OL 310 is also performed using APIs.

FIGS. 4, 5A, 5B, 6, and 7 are simplified diagrams illustrating the various processes of the verification software 102 of FIGS. 1 and 2. The authentication portion 104 is not illustrated in these diagrams. Some authentication of the bank customer is made prior to the customer making the secure object request 132. To enter the banking mobile app 116 or the banking website 118, the customer enters a username and password. The banking mobile app 116 and the banking web site 118 may invoke two-step authentication by sending a PIN via SMS or email message to the bank customer. Voiceprint, biometric scanning, and other mechanisms for further authentication may be invoked. The eligibility portion 106 of the verification software 102 supplements the authentication 104 by determining customer stability, transaction history, and physical location.

Figure 4:
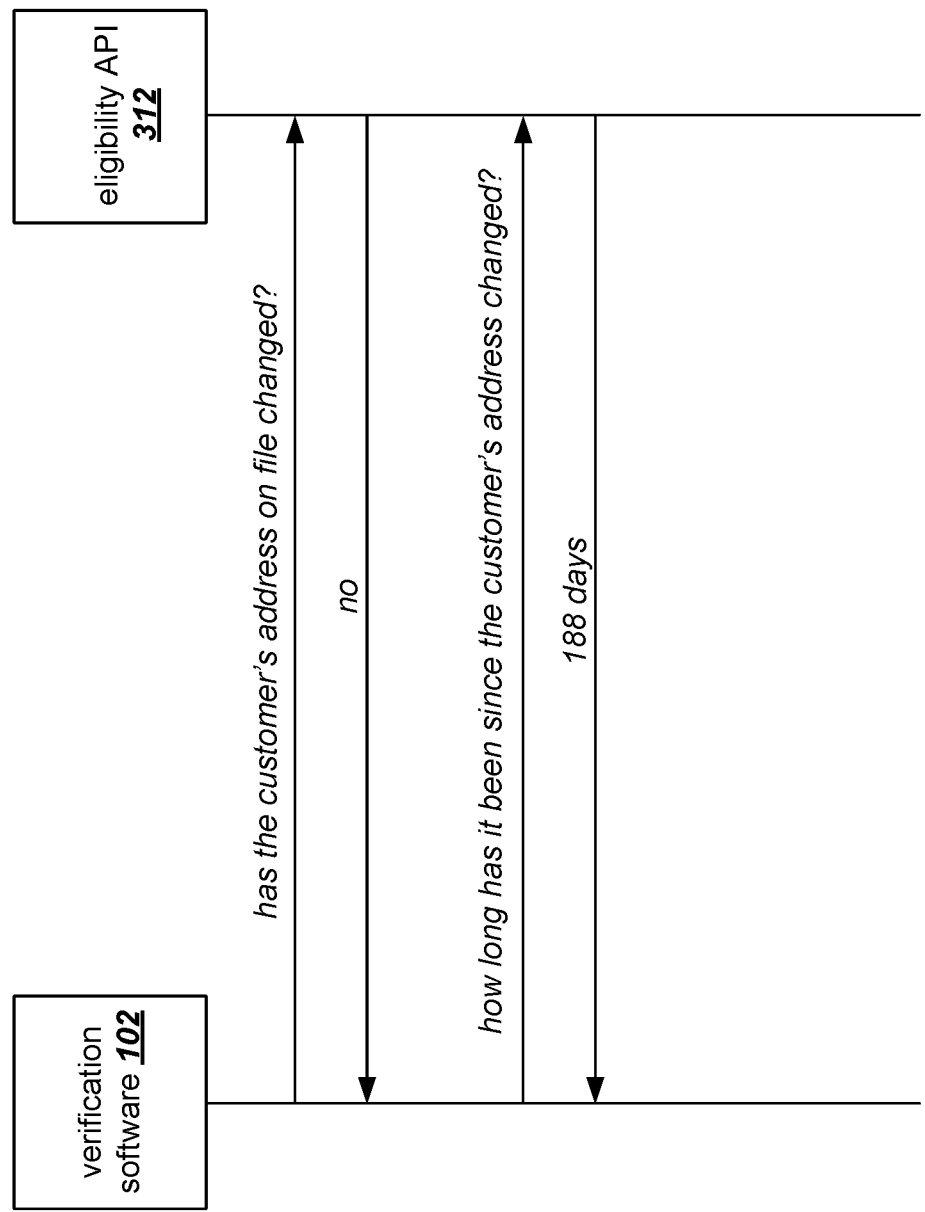
FIG. 4 illustrates the customer stability portion of the verification software of FIGS. 1 and 2.

FIG. 4 illustrates operations of the customer stability portion 108 of the verification software 102. Here, the customer stability portion 108 of the verification software 102 uses the eligibility API 312 to determine whether the bank customer is a good candidate for receiving the secure object at a remote location. The customer stability portion 108 may ask "yes" or "no" questions, such as, has the customer's address on file changed? Or, the customer stability portion 108 may make inquiries that generate non-binary responses, such as, how long has it been since the customer's address changed? For either type of inquiry, the eligibility API 312 consults the customer database 124 to provide a response. The verification software 102 receives a response from the eligibility API 312, which informs the bank whether the bank customer is a good candidate for receiving the secure object at a remote location.

Figure 5A:
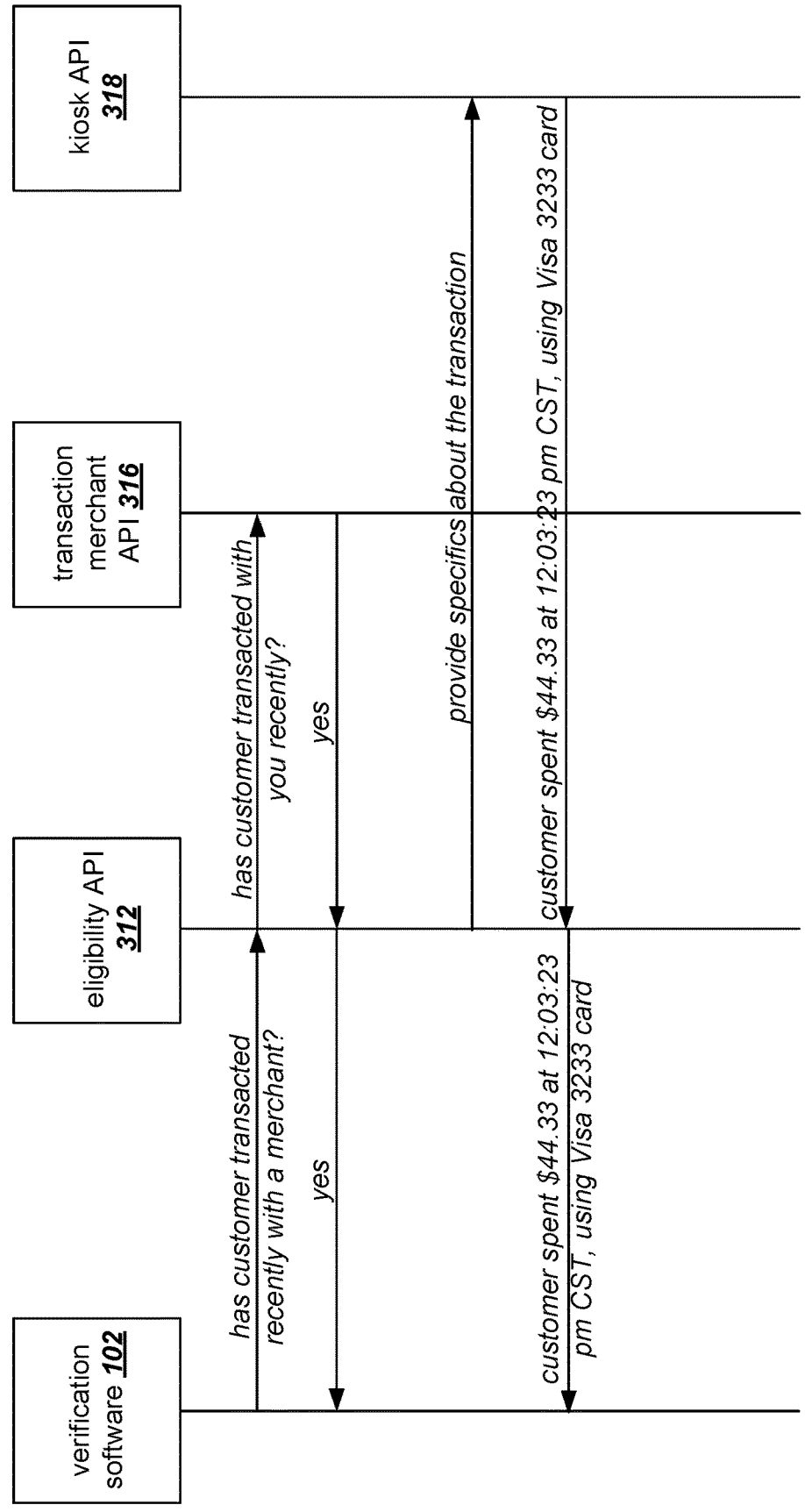
FIGS. 5A and 5B illustrate the transaction history portion of the verification software of FIGS. 1 and 2.
Figure 5B:
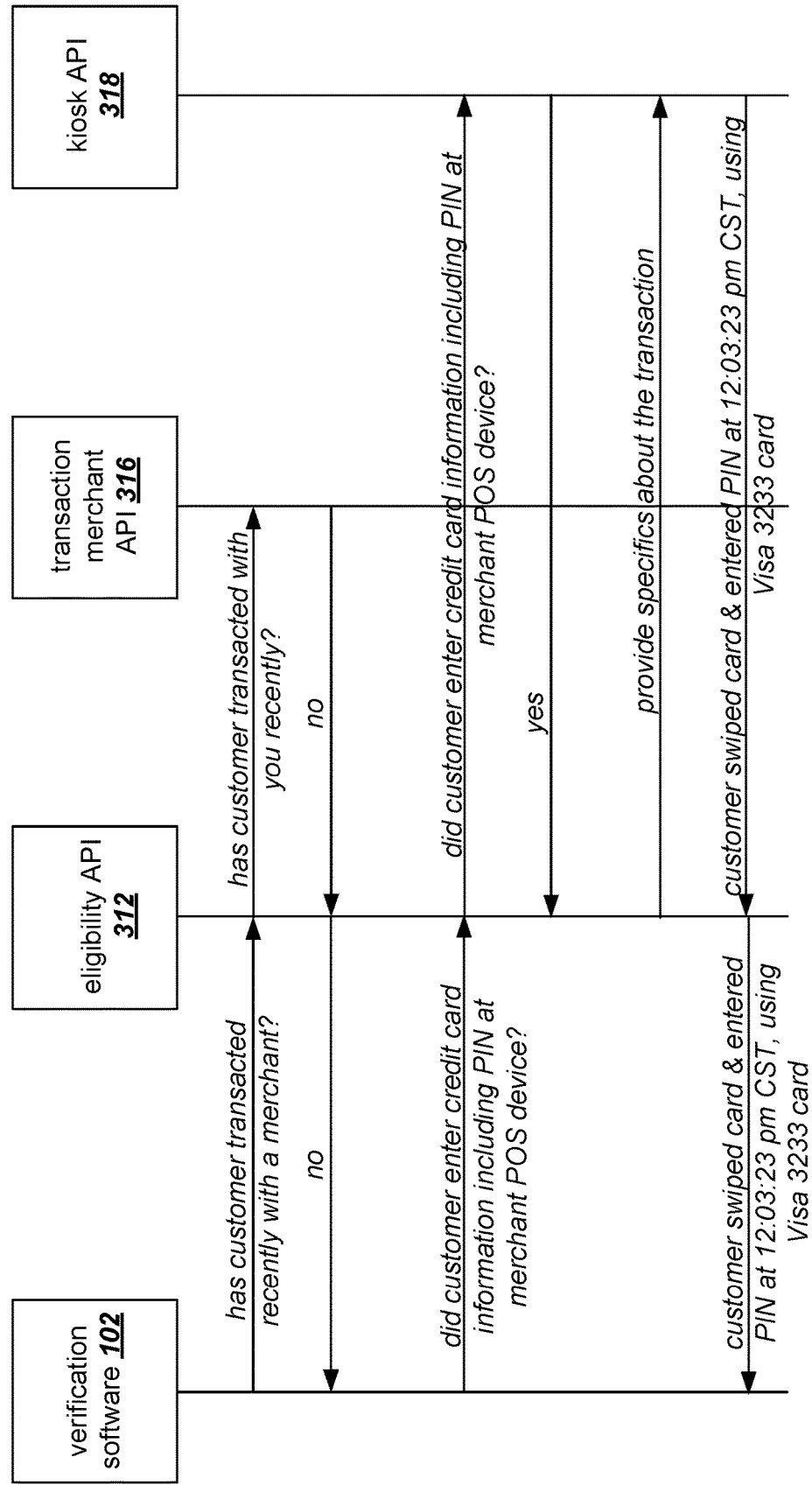

FIGS. 5A and 5B illustrate two embodiments 110A and 110B of operations of the transaction history portion of the verification software. In these examples, the eligibility API 312 works with the transaction merchant 316 and kiosk 318 APIs to service both the transaction history 110 and physical location 112 portions of the verification software 102. Recall that the transactions merchant API 316 is associated with the merchant 126 in FIG. 1 and the kiosk API 318 is associated with the POS device 128 of that merchant.

In embodiment 110A (FIG. 5A), the verification software 102 makes an inquiry, has customer transacted recently with a merchant? The eligibility API 312 forwards the inquiry to the transaction merchant API 316, and a response, yes, is received. The eligibility API 312 makes a subsequent inquiry, provide specifics about the transaction, but this time the inquiry is made to the kiosk API 318 rather than the transaction merchant API 316. In this example, the kiosk API 318 replies with specific transaction information, and that information is passed on by the eligibility API 312 to the verification software 102.

In embodiment 110B (FIG. 5B), the same initial inquiry is made by the verification software 102 to the eligibility API 312. This time, however, the response is that no transaction has happened at the merchant. As described further in the method operations of FIG. 9, below, if the bank customer has not transacted with the merchant, the verification software 102, through one of the customer request interfaces 114 (FIG. 1) would instruct the customer to enter the merchant premises and enter credit card information into a POS device. Preferably, the credit card would be a chip and PIN credit card. Like debit cards, chip and PIN credit cards include a personal identification number (PIN) that is entered when using the card. No transaction is necessary in this scenario. Instead, the customer is instructed to insert the card into the POS device 128 of the merchant 126 and enter the PIN associated with the card.

Thus, in embodiment 110B, the verification software 102 inquires whether the bank customer action took place: did customer enter credit card information at merchant? The kiosk API 318 replies affirmatively, after which the eligibility API 312 requests specifics of the transaction to the kiosk API 318. The kiosk API 318 provides the specific bank customer transaction in a response to the eligibility API 312, and that response is forwarded to the verification software 102.

Figure 6:
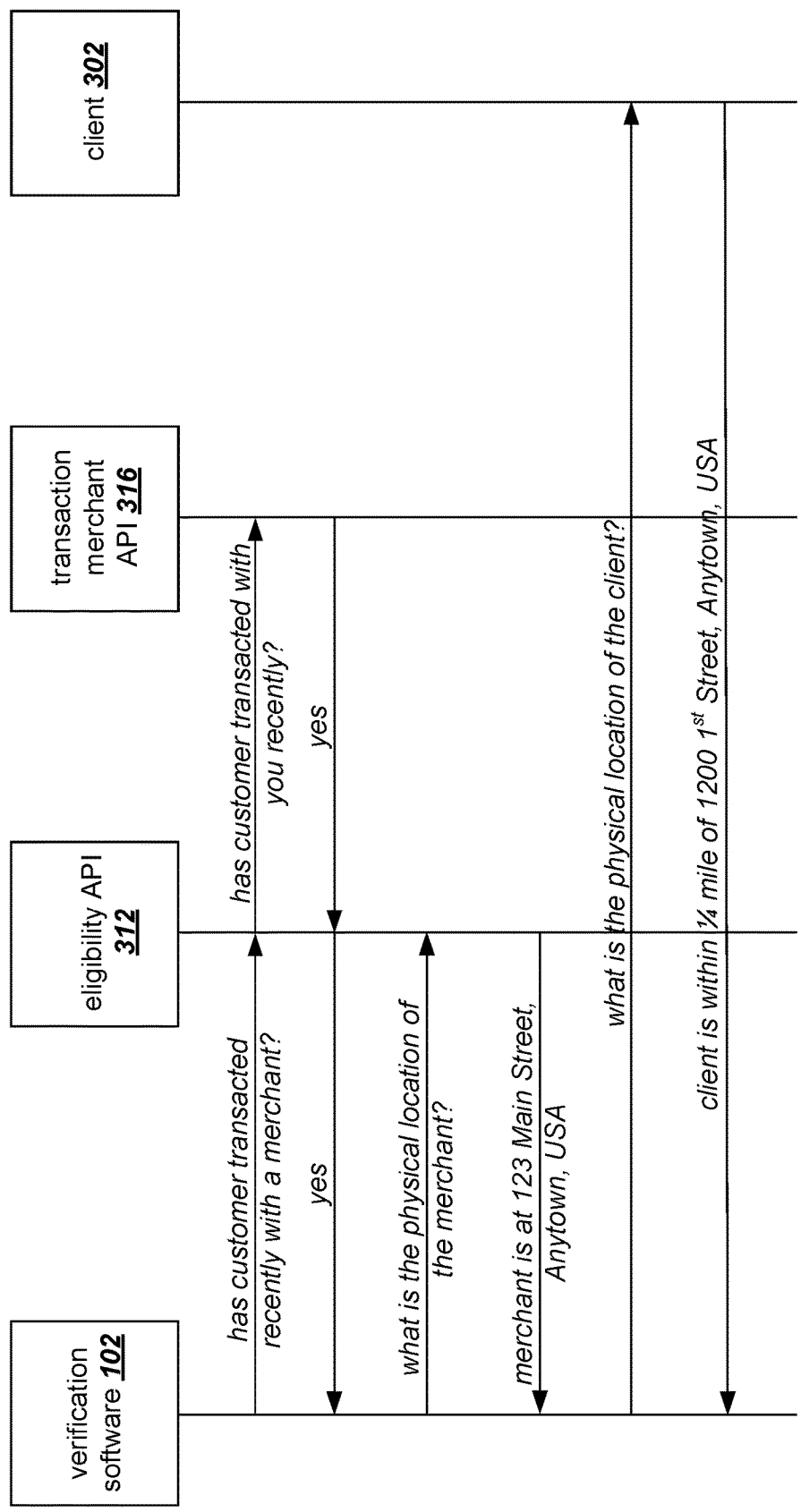
FIG. 6 illustrates the physical location portion of the verification software of FIGS. 1 and 2.

Thus, in both embodiments 110A and 110B, the verification software 102 is provided with transaction history of the bank customer. Further, the operations of FIGS. 5A and 5B place the bank customer at the merchant, and thus additionally provide location information of the customer. FIG. 6 illustrates operations of the physical location portion 112 of the verification software 102. The eligibility API 312 is queried whether the customer has transacted recently with a merchant, and the eligibility API 312 queries the transaction merchant API 316 of the merchant, has customer transacted with you recently? In this example, the transaction merchant API 316 responds affirmatively, and this response is passed by the eligibility API 312 to the verification software 102. The verification software 102 then asks for the physical address of the merchant. The eligibility API 312 knows which merchant is associated with the transaction merchant API 316 and thus has access to relevant information about the merchant, such as its physical address. Thus, the eligibility API is able to provide the verification software 102 with the merchant's physical address. In other examples, the eligibility API 312 asks the transaction merchant API 316 for the physical address of the merchant before receiving the information.

Recall from FIG. 1 that the physical location is obtained by the verification software 102 both from the merchant 126 and from the customer request interface 114. Thus, the verification software 102 communicates directly with the client 302, which may be a smartphone or other mobile device from which the banking mobile app 116 is invoked or a computer-based device from which the banking website is invoked. The verification software 102 asks, what is the physical location of the client? The client 302 may, for example, include location-based software or hardware for retrieving this information. In one example, the client 302 provides a specific address. In other examples, the client 302 provides a range, in this case, ¼ mile, of a specific physical address. However, the client device 302 may provide any type of location data (e.g., GPS coordinates, network-based location data, etc.).

Once the verification software 102 receives the physical location of the merchant and the physical location of the bank customer's client 302 (whether mobile device or stationary computer), the verification software is able to know approximately the location of the bank customer. Further, the bank customer may have specified where the secure object is to be sent, such as a hotel. This additional physical location data point enables the bank to know, with a high degree of certainty, the location of its accountholder. The eligibility evaluation of the verification software may be done before or after asking the customer where the secure object is to be sent.

FIG. 7 illustrates the secure object delivery portion 130 of the verification software 102. The secure object delivery 130 utilizes two external APIs, the maps API 320 and the courier API 322. The secure object delivery portion 130 of the verification software 102 sends an inquiry to the maps API 320 about the location of the bank customer and receives a response. The secure object delivery portion 130 of the verification software 102 also sends instructions to the courier API 322 to send the secure object to the customer at the retrieved location and receives a response.

Figure 8A:
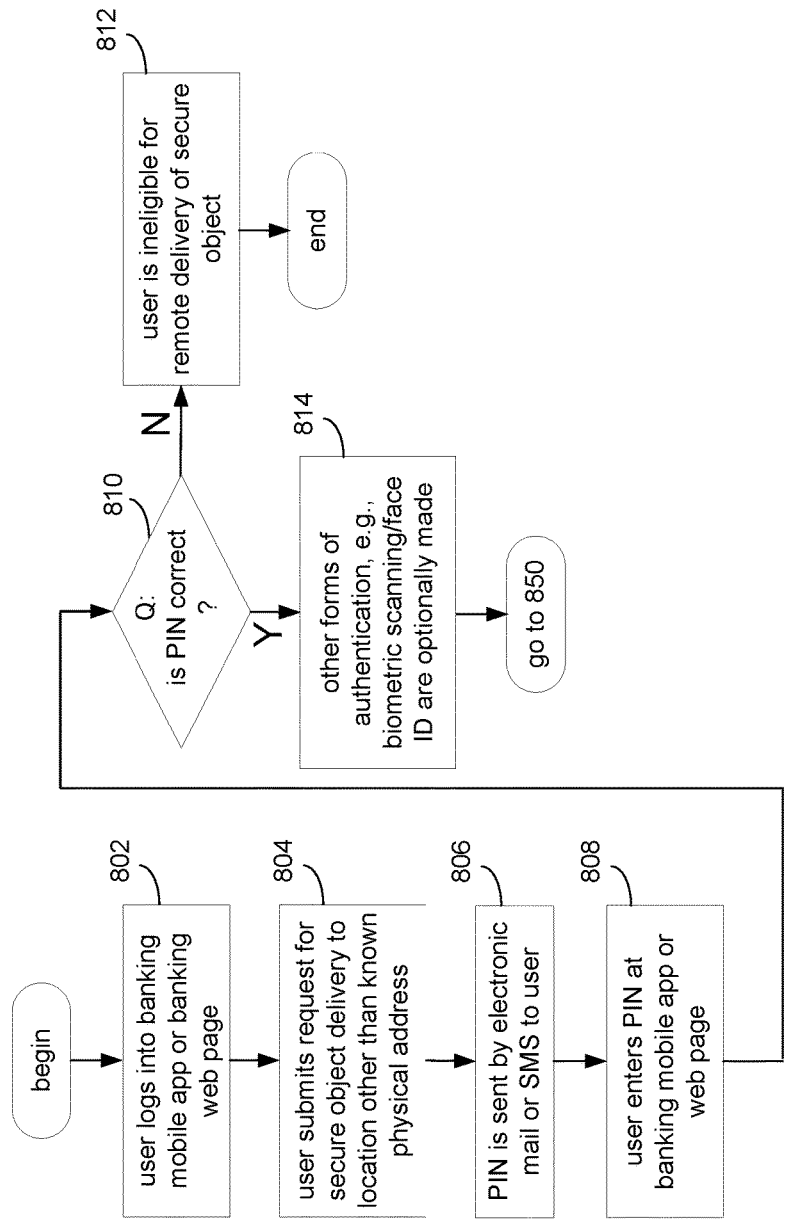

FIGS. 8A-8C illustrate a method for verification before sending secure object 800. The method steps are divided into three parts, 800A (FIG. 8A), 800B (FIG. 8B), and 800C (FIG. 8C). FIG. 8A describes the preliminary authentication of the bank customer using either the banking mobile app 116 or banking website 118 (FIG. 1) from the client 302 (FIG. 3). FIG. 8B describes the preliminary authentication of the bank customer who calls the bank directly, such as a branch bank number or an 800 number of the bank. FIG. 8C describes the eligibility operations of the verification software 102, namely, the customer stability 108, transaction history 110, and physical location 112 portions. One or more of these method steps may take place in an order other than is shown. Further, the operations of FIG. 8A are alternative to the operations of FIG. 8B.

Starting with FIG. 8A, the bank customer logs into either the banking mobile app 116 or the banking website 118 (block 802). The bank customer enters a unique username and password to enter the customer request interface 114. The bank customer submits the request for secure object delivery to a location other than the physical address the bank has on file (block 802). The request for secure object delivery may be an option on the banking app 116 or banking website 118. In one example, if the bank customer's address has changed recently, such as within the last 30 days, and the change of address is already known by the bank, the option may be grayed out on the banking app 116 or banking website 118, indicating that the bank customer is not eligible to receive this service. The banking app 116 or banking website 118 may further issue a pin to the bank customer, either by SMS (text messaging) or electronic mail (block 806). The authentication of the bank customer occurs when the customer enters the PIN in a designated location at the banking app 116 or banking website 118 (block 808). If the PIN entered by the bank customer is not correct (block 810), the user is ineligible to receive remote delivery of the requested secure object (block 812). Otherwise, the authentication portion 104 of the verification software 102 may further request other forms of authentication, including but not limited to, biometric scanning of the face, the iris, the voice, or the fingerprint of the bank customer (block 814). Once these operations 800A are complete, control proceeds to step 850 (FIG. 8C).

In FIG. 8B, the operations 800B pertain to the bank customer who does not use the banking mobile app 116 or banking website 118, but instead uses the banking phone number 120 portion of the customer request interface 114 (FIG. 1). The bank customer calls the banking phone number, which may be a local branch bank or a toll-free (800) phone number (block 820). Upon connection with a banking specialist, the customer verbally requests secure object delivery to a location other than their address on file, which is typically a home address (block 822). The banking specialist will ask the bank customer if they have a mobile device that accepts SMS messages (block 824). If so, a PIN is sent by the banking specialist to the mobile device of the bank customer (block 826). The user is asked to verbally recite the received code, which is noted by the banking specialist (block 828).

If, instead, the bank customer does not have a device for accepting SMS messages, the banking specialist will inquire whether the customer has a device for accepting electronic mail messages (block 830). In one embodiment, if neither SMS messages nor electronic mail are available, the banking specialist will inform the bank customer that they are not eligible to receive remote delivery of a secure object (block 832). If instead the bank customer does have electronic mail capability, the banking specialist sends a PIN to the electronic mail (email) address of the bank customer (block 834). The user is asked to verbally recite the received code, which is noted by the banking specialist (block 836). Whether the PIN is transmitted via SMS or electronic mail, the banking specialist will determine whether the verbally recited PIN is correct (block 838). If not, the bank customer is not eligible to receive the secure object delivery of the remote object (block 832). Otherwise, if the PIN is correct, the banking specialist will send a secure object request as well as the bank customer information to the bank server(s) 122 to be received by the verification software 102 and control proceeds to step 850 (FIG. 8C).

FIG. 8C describes the eligibility operations 106 of the verification software 102. The eligibility operations 106 of the verification software 102 inquires whether the physical address of the bank customer has changed during a defined time period (block 852). The defined time period may be 30 days as one example. Recall from FIG. 4 that the verification software 102 uses the eligibility API 312 to make this determination. If the physical address has changed, the bank customer is ineligible for remote delivery of the secure object (block 856). Otherwise, an inquiry is made whether the user has another credit or debit card (block 854). This inquiry may be sent to the bank customer through the banking mobile app 116 or banking website 118. If no additional credit or debit card is available, the bank customer is ineligible to receive the secure object by remote delivery (block 856).

If the bank customer does have a credit or debit card available, an additional inquiry is made whether the customer has transacted recently with a merchant in physical proximity (block 858). If not, the bank customer is instructed to enter a nearby merchant premises (block 860) and insert the credit or debit card into a POS device at the merchant, followed by entry of the correct PIN (block 862). Recall from FIGS. 5A and 5B that the verification software 102 uses the eligibility API 312 (and the eligibility API uses the kiosk API) to make this determination. If, instead, the bank customer has transacted recently with a merchant, the transaction data is obtained from the merchant (block 864). Recall from FIGS. 5A and 5B that the verification software 102 uses the eligibility API 312 (and the eligibility API uses the transactions merchant API) to make this determination.

Once either the transaction history of the bank customer or the recent verification of the customer location based on the use of the POS device of the merchant, first location information is next retrieved from the client of the bank customer, where the client is a computing device of the customer (block 866). Second location information is retrieved from the merchant where the bank customer either completed a transaction at the merchant or entered a credit card and PIN into a POS device of the merchant (block 868). Recall from FIG. 6 that the verification software 102 uses the eligibility API 312 (and the eligibility API uses the transaction merchant API) to determine the merchant location, and direct communication with the client 302 to determine the mobile device/computer location. Once the first and second locations are known, a comparison is made to determine whether they are in proximity to one another (block 870). The bank will decide what constitutes "in proximity" in this inquiry. If the bank customer is in the merchant premises and in possession of the mobile device used to make the secure object request 132 while these operations are occurring, the mobile device is likely close to the merchant physical address, although the location of the mobile device may not be a physical address but a location within a range. The location data may be Global Positioning System (GPS) data, a network-based location, latitude/longitude information, or other type of location data. The location data may map to a region or to an address. If the first location is in proximity to the second location, the bank customer is eligible to receive the secure object at the remote location (block 872). Otherwise, the bank customer is ineligible (block 874).

Thus, the system 100, apparatus 200, operating environment 300, and method 800 illustrate different views to enable a bank to perform verification before sending a secure object to a remote location. The core innovation is using payment rails normally used for credit and debit card transactions to determine a bank customer's physical location and using that as authentication that they are who they say they are. As part of the banking on demand capability, the bank is able to let their customers get a debit or credit card delivered to them quickly at the remote location, which may be at the merchant premises or nearby.

Optionally, a point system indicating a model risk score of the bank customer may be utilized by method 800. For example, rather than saying the user is ineligible for remote delivery of the secure object (blocks 812, 832, 856, and 874), the bank customer may receive points for successful completion of one or more of the tests. A five-point model risk score may be assigned, from 0 to 5, with only bank customers getting a 4 or 5 being eligible to receive delivery of the secure object. Landing at blocks 812, 832, 856, and 874, instead of rendering the bank customer ineligible to receive the secure object at a remote location, lowers the bank customer's score by one point. Further, the model risk score of the bank customer may be stored in the customer database 124 and used as an initial point score of the bank customer. Other point-based mechanisms may be employed by the bank to determine which bank customers are eligible for the secure object delivery.

When considering sending a secure item, such as a debit card, cashier's check, money order, or cash, to a bank customer at a remote address, especially when the address is not their permanent address on file or an otherwise "known" location, a fraudster may take control of a bank customer's account and order the item to go to the remote address. Sending the secure item to the permanent address or known location prevents the fraudster from receiving that item and notifies the bank customer that a fraudster has ordered the item. However, banks with enhanced Banking on Demand services want to provide convenience to their customers by sending their debit card, cashier's check, money order, or cash where and when the customers want the secure item. The system 100, apparatus 200, operating environment 300, and method 800 described herein make this possible with a high degree of confidence.

Although the verification before sending a secure object is illustrated and described with respect to banks or other financial institutions, the system 100, apparatus 200, and method 800 may be implemented by other businesses not in the financial realm. Many different types of businesses manage secure objects, such as important documents. The operations described herein in which the payment rails are utilized to ensure the identity and physical location of one of their customers before delivering the secure object may be utilized by a variety of different businesses, not just banks. The method of verification before sending a secure object may be an alternative to overnight delivery of the object, for example. The specific examples involving banks are not meant to be limiting.

Figure 9:
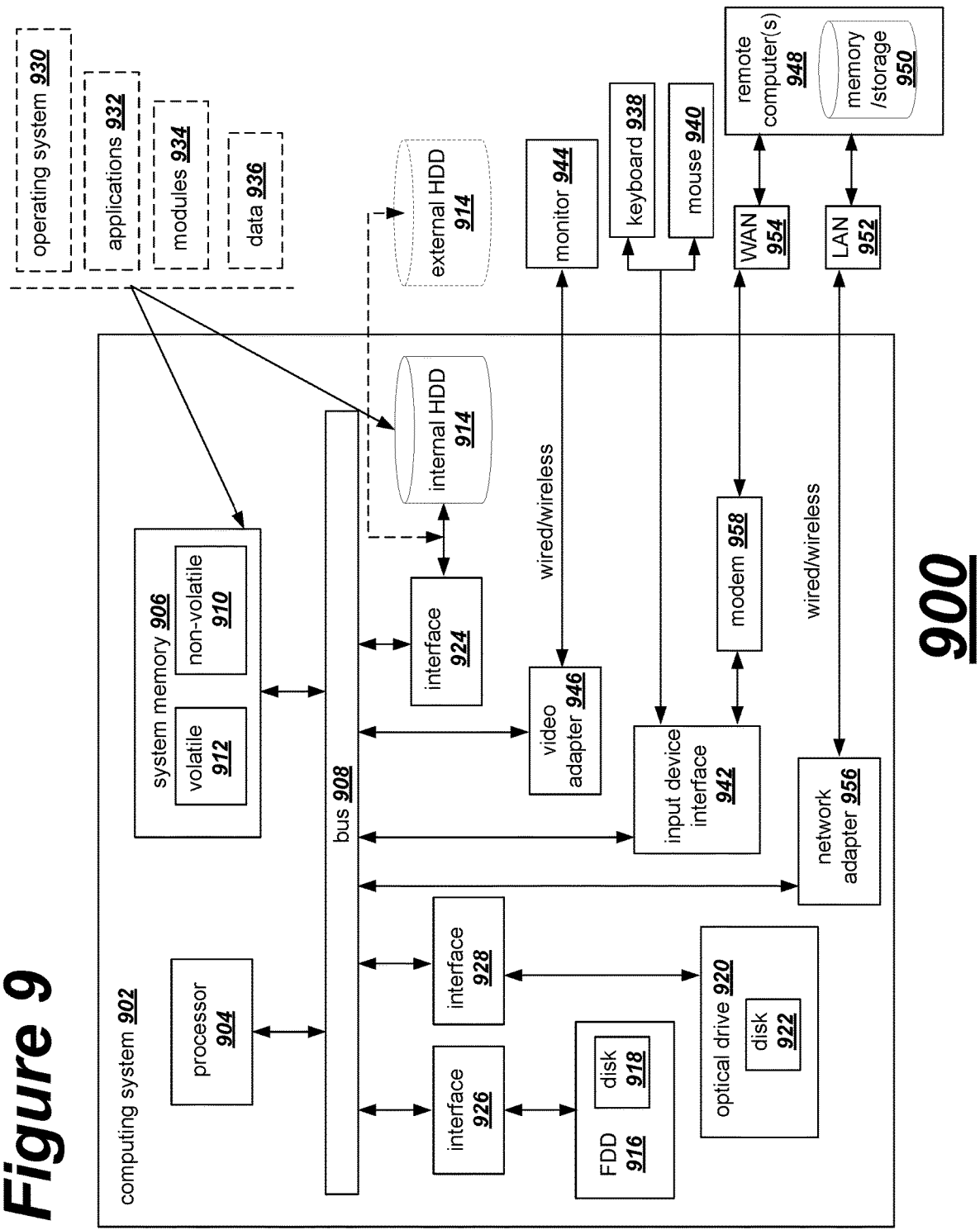
FIG. 9 illustrates an embodiment of a communications architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100, apparatus 200, operating environment 300, and method 800 for verification before sending a secure object. In some embodiments, computing system 902 may be representative, for example, of the apparatus 200 for verification before sending a secure object. The embodiments are not limited in this context. More generally, the computing architecture 900 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 900. For example, a component be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information may be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 may be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 904.

The system bus 908 provides an interface for system components including, but not limited to, the system memory 906 to the processor 904. The system bus 908 may be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 is not a propagating signal divorced from the underlying hardware of the computing system 902 and is thus non-transitory. The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 may include non-volatile memory 910 and/or volatile memory 912. A basic input/output system (BIOS) may be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 may be connected to the system bus 908 by a HDD interface 924, an FDD interface 926 and an optical drive interface 928, respectively. The HDD interface 924 for external drive implementations may include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules may be stored in the drives and memory units 910, 912, including an operating system 930, one or more application programs 932, other program modules 934, and program data 936. In one embodiment, the one or more application programs 932, other program modules 934, and program data 936 may include, for example, the various applications and/or components of the verification software 102 of the system 100 for verification before sending secure object.

A user may enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but may be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 may, for example, store the customer database 124 being tested, the PUT 112, while the verification software 102 resides on the computing system 902. The remote computer 948 may be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 may facilitate wire and/or wireless communications to the LAN 952, which may also include a wireless access point disposed thereon for communicating with the wireless functionality of the adaptor 956.

When used in a WAN networking environment, the computing system 902 may include a modem 958, or is connected to a communications server on the WAN 954 or has other means for establishing communications over the WAN 954, such as by way of the Internet. The modem 958, which may be internal or external and a wire and/or wireless device, connects to the system bus 908 via the input device interface 942. In a networked environment, program modules depicted relative to the computing system 902, or portions thereof, may be stored in the remote memory/storage device 950. It will be appreciated that the network connections shown are exemplary and other means of establishing a communications link between the computers may be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication may be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network may be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operation in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system comprising:
one or more processors operable to execute stored instructions that, when executed, cause the one or more processors to:
receive, via a first application programming interface (API), a request for a secure object from a user device associated with an accountholder of a bank over a wireless communication network, wherein the secure object is a physical object to be delivered by a courier system to a physical address different than a permanent physical address of the accountholder;
determine, via a second API different from the first API, that the accountholder is eligible to receive the secure object by at least consulting a lookup table in a database stored in a storage device controlled by the bank and determine whether the accountholder has transacted with a merchant by calling at least one third party API, the third party API being associated with the merchant, wherein at least the first and second APIs are programming interfaces that allow programming code associated with the first and second APIs communicate with each other or programming code associated with other APIs;
authenticate the accountholder by:
causing a prompt on a display device of a point-of-sale (POS) device associated with the merchant to instruct the accountholder to insert a transaction card corresponding to the accountholder into the POS device and enter, via a user interface of the POS device, a Personal Identification Number (PIN) associated with the transaction card; and
receiving a first API communication from the POS device, the first API communication comprising an indication confirming that the PIN is associated with the transaction card;
determine, in response to a user device communication from the user device, first location information associated with the user device based on data provided by the user device;
determine second location information associated with the POS device based on data provided by the POS device the first API communication;
determine that the first location is in proximity to the second location;
receive a second API communication comprising an indication of the physical address entered by the accountholder via a user interface of the user device;

determine that the physical address is in proximity to the first location; and transmit a third API communication to the courier system, the third API communication comprising instructions to retrieve the secure object from the bank and deliver the secure object to the accountholder at the physical address.

2. The system of claim 1, wherein the third API communication is transmitted wirelessly between the bank and the courier system.

3. The system of claim 2, wherein the one or more processors are further caused to authenticate the accountholder based on accountholder behavior by receiving, from the POS device, a merchant transactions API communication, the merchant transactions API comprising historical information about one or more transactions between the accountholder and the merchant.

4. The system of claim 1, wherein the one or more processors are further caused to:

receive the request for the secure object over the wireless communication network from a banking application on the user device, wherein the accountholder signed into the banking application using a username and password; and cause communication, via the wireless communication network, of a one-time PIN code to the user device, the one-time PIN code to be entered into an interface of the banking application by the accountholder.

5. The system of claim 1, wherein the one or more processors are further caused to:

receive the request for the secure object from a website on the user device, wherein the accountholder signed into the website using a username and password; and cause communication, via the wireless communication network, of a one-time PIN code to a mobile device or electronic mail address of the accountholder, the one-time PIN code to be entered into an interface of the website by the accountholder.

6. The system of claim 1, wherein the one or more processors are further caused to confirm that the accountholder is eligible to receive the secure object by determining that the permanent physical address, phone number, and electronic mail address of the accountholder have been unchanged for a predetermined number of days.

7. The system of claim 1, wherein the one or more processors are further caused to:

receive the request for the secure object from a banking specialist, wherein the accountholder called a phone number of the bank and verbally requested the secure object; and cause communication, via the wireless communication network, of a one-time PIN code via Short Message Service (SMS) or electronic mail of the accountholder, the one-time PIN code to be verbally conveyed to the bank specialist by the accountholder.

8. At least one non-transitory machine-readable storage medium comprising instructions that, when executed by at least one processor, cause the at least one processor to:

receive, via a first application programming interface (API), a request for a secure object from a user device associated with an accountholder of a bank over a wireless communication network, wherein the request is received wirelessly from a banking application on a mobile device, the banking application being associated with the bank, wherein the accountholder signed into the banking application using a username and password and the secure object is a physical object;

consult, via a second API different from the first API, a database of accountholder information stored in a non-volatile storage device controlled by the bank to:

determine that a permanent physical address, phone number, and electronic mail address of the accountholder have been unchanged for at least 30 days; and determine that the accountholder is eligible to receive the secure object based on a model risk score of the accountholder;

determine, via the second API, that the accountholder is eligible to receive the secure object by calling at least one third party API to determine whether the accountholder has transacted with a merchant, the third party API being associated with the merchant;

authenticate a first location of the accountholder as a location of the mobile device based on data received in a first API communication from the mobile device;

further authenticate the accountholder by:

causing a prompt on a display device of a point-of-sale (POS) device or Automatic Teller Machine (ATM) to provide instructions to insert a transaction card corresponding to the accountholder into the POS device and enter, via a user interface of the POS device, a Personal Identification Number (PIN) associated with the transaction card; and receiving a kiosk API communication from the POS device, the kiosk API communication confirming that the PIN is associated with the transaction card;

receive second location information based on data provided by the POS device;

determine that the first location is in proximity to the second location;

receive a second API communication comprising an indication of a physical address entered by the accountholder via a user interface of the mobile device, wherein the physical address comprises a third location for physical delivery of the secure object; and determine that the third location is in proximity to the second location.

9. The at least one non-transitory machine-readable storage medium of claim 8, further comprising instructions that, when executed by a processor, cause the processor to:

receive a third API communication of a physical location of the merchant or ATM from the POS device;

confirm that the physical address is within a predetermined distance of the physical location; and transmit a fourth API communication to a courier system, the fourth API communication comprising instructions to retrieve the secure object from the bank and deliver the secure object to the accountholder at the physical address.

10. The at least one non-transitory machine-readable storage medium of claim 8, further comprising instructions that, when executed by a processor, cause the processor to:

receive a third API communication of a physical location of the merchant or ATM from the POS device;

confirm that the physical address is not within a predetermined distance of the physical location; and transmit a fourth API communication to the mobile device, the fourth API communication informing the accountholder that physical delivery of the secure object to the physical address is denied.

11. The at least one non-transitory machine-readable storage medium of claim 8, further comprising instructions that, when executed by a processor, cause the processor to authenticate the accountholder based on the location of the accountholder by:

receiving a merchant transactions API communication from the merchant, the merchant transactions API communication to indicate a recent transaction by the accountholder at a premises of the merchant.

12. The at least one non-transitory machine-readable storage medium of claim 8, further comprising instructions that, when executed by a processor, cause the processor to:
cause communication, via the wireless communication network, of a one-time PIN code to the mobile device, the one-time PIN code to be entered by the accountholder into an interface of the banking application by the accountholder.

13. The at least one non-transitory machine-readable storage medium of claim 12, further comprising instructions that, when executed by the processor, cause the processor to authenticate the accountholder based on the location of the accountholder by:
receive a third API communication of location tracking information from the banking application of the mobile device, wherein the location tracking information indicates the location of the accountholder.

14. The at least one non-transitory machine-readable storage medium of claim 8, further comprising instructions that, when executed by a processor, cause the processor to confirm that the accountholder is eligible to receive the secure object by:
determining that the model risk score of the accountholder, on a 0 to 5 scale, with 0 meaning "high risk" and 5 meaning "low risk", is either a 4 or a 5.

15. An apparatus comprising:
a processor; and
memory coupled to the processor, the memory comprising instructions that, when executed by the processor, cause the processor to:
receive, via a first application programming interface (API), a request for a new debit card from a mobile device associated with an accountholder of a bank over a wireless communication network, wherein the debit card is to be delivered to the accountholder at a physical address different from a permanent physical address of the accountholder known to the bank;
determine, via a second API different from the first API, that the permanent physical address, a phone number, and an electronic mail address of the accountholder have been unchanged for at least 30 days by consulting a database stored in a secure storage device controlled by the bank and calling at least one third party API for determining whether the accountholder has transacted with a merchant, the third party API being associated with the merchant;
authenticate a location of the accountholder by causing a prompt on a display device of a merchant point-of-sale (POS) device to instruct to insert a transaction card corresponding to the accountholder into the merchant POS device and enter, via a user interface of the merchant POS device, a Personal Identification Number (PIN) associated with the transaction card;
determine, in response to a mobile device communication from the mobile device, first location information associated with the mobile device based on data provided by the mobile device;
receive a kiosk API communication from the merchant POS device, the kiosk API communication confirming that the PIN is associated with the transaction card;
determine second location information based on data provided by the merchant POS device;
determine that the first location is in proximity to the second location; and
determine that the physical address is in proximity to the second location.

16. The apparatus of claim 15, the memory further comprising instructions that, when executed by the processor, cause the processor to:
receive a merchant transactions API communication from the merchant POS device, the merchant transactions API communication comprising historical information about one or more transactions between the accountholder and the merchant.

17. The apparatus of claim 16, the memory further comprising instructions that, when executed by the processor, cause the processor to:
receive the request for the new debit card from a banking application on the mobile device, the banking application being associated with the bank, wherein the accountholder signed into the banking application using a username and password; and
transmit a one-time PIN code to the mobile device, the one-time PIN code to be entered into an interface of the banking application by the accountholder.

18. The apparatus of claim 17, the memory further comprising instructions that, when executed by the processor, cause the processor to further:
receive an API communication of mobile device location from the mobile device.

19. The apparatus of claim 18, the memory further comprising instructions that, when executed by the processor, cause the processor to:
confirm that the location is proximate to the mobile device location; and
transmit a mobile device API communication to the mobile device, the mobile device API communication informing the accountholder that the request to deliver the debit card to the physical address is accepted.

20. The apparatus of claim 15, the memory further comprising instructions that, when executed by the processor, cause the processor to:
determine that the physical address is not within a predetermined distance of the merchant location; and
transmit an API communication to the mobile device, the API communication informing the accountholder that the request to deliver the debit card to the physical address is denied.

* * * * *